No. 854,261. PATENTED MAY 21, 1907.
R. T. YATES.
MOTOR CAR TRAFFIC SYSTEM.
APPLICATION FILED FEB. 5, 1907.
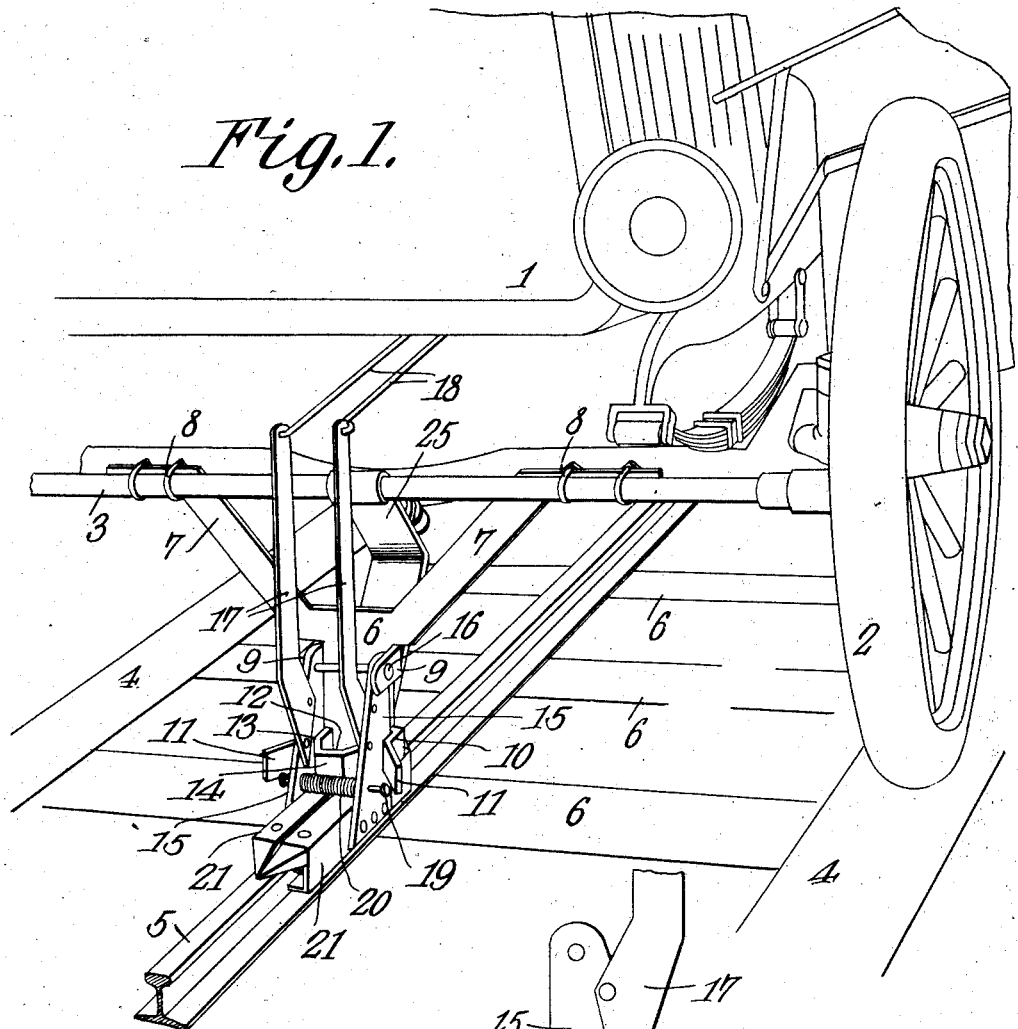
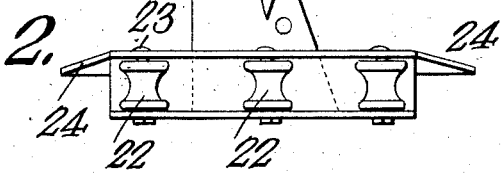
Robert T. Yates,
INVENTOR
WITNESSES:
By
ATTORNEYS

UNITED STATES PATENT OFFICE.

ROBERT T. YATES, OF LYTTON SPRINGS, TEXAS.

MOTOR-CAR TRAFFIC SYSTEM.

No. 854,261.  Specification of Letters Patent.  Patented May 21, 1907.

Application filed February 5, 1907. Serial No. 355,910.

*To all whom it may concern:*

Be it known that I, ROBERT T. YATES, a citizen of the United States, residing at Lytton Springs, in the county of Caldwell and State of Texas, have invented a new and useful Motor-Car Traffic System, of which the following is a specification.

This invention has reference to improvements in motor car traffic systems, and its object is to provide a means whereby motor cars may be constrained to move in a predetermined path without the volition of the chauffeur, so that motor cars may be adapted for use in suburban traffic in place of the ordinary trolley cars.

The invention consists essentially of a trackage or narrow bearing surface for the wheels of a motor car, which is sufficiently wide to accommodate such wheels and made of some hard, firm material embedded in the ground along the desired line of way. Intermediate of the surfaces designed for receiving the wheels, there is located a guide rail, and attached to the motor car there is a clamping means for engaging the said guide rail and holding the motor vehicle to said track. This clamping device consists of two parts which may be moved laterally with relation to the track for bringing the clamps in operative relation with the track and for releasing the clamp from the track, these operations being under the control of the operator of the motor car.

The prime purpose of this invention is to provide for sparsely settled suburban territory a traffic system which will require but little capital to install it as compared with the ordinary trolley systems now in use, so that sections may be developed where the cost of an ordinary trolley system would be prohibitive.

The invention will be fully understood from the following description taken in connection with the accompanying drawings forming part of this specification, in which,—

Figure 1 is a perspective view of a portion of the improved road-bed and of the fore part of a motor car with my improved clamping means attached thereto and in operative relation to a guide-rail in the road-bed; and Fig. 2 is a detail view of a portion of the clamping mechanism.

Referring to the drawings, there is shown in Fig. 1 a motor car 1 of any suitable or approved type, the fore part of the car and one of the supporting wheels 2, together with the cross rod 3 of the steering mechanism, only being shown.

The road-bed is provided with two parallel narrow strips 4—4 of asphaltum, cement, well-compacted cinders, or any other suitable material which will form a hard bearing surface for the wheels. Such strips or tracks for the wheels may be formed at much less expense than the cost of laying trackage such as is usually employed for trolley cars. The two strips 4—4 are spaced apart sufficiently to accommodate motor cars of ordinary construction; or, if desired, special cars may be built of narrow width and the strips 4—4 will be in this case spaced correspondingly nearer together.

Intermediate of the two track strips 4—4 and parallel therewith there is a rail 5 supported at suitable intervals upon cross-ties 6 embedded in the ground between the trackage surfaces 4—4. This rail 5 may be the usual T-rail employed upon railroads of ordinary construction, but since it is intended as a guide rail only and not to carry any weight, it will be of light construction as compared with ordinary trolley rails. It will now be seen that when the front running gear of a motor car is coupled to this rail so as to move freely along the same but held thereto in such manner that the fore wheels 2 are compelled to travel upon the surfaces 4—4, there is produced a system wherein ordinary motor cars designed for the transportation of passengers or freight replace the expensive trolley cars of the usual trolley system, and each motor car being a power unit, it is independent of every other car of the system, and all central stations and electric power systems that have heretofore been generally employed for suburban traffic are avoided, so that the running expenses of a system such as contemplated by my invention are much lower than those of the ordinary trolley system and it can therefore be utilized under conditions where the expense of installing an ordinary trolley system would be too great.

Coming, now, to the construction of the connecting devices between the motor vehicle and the guide-rail, which devices constitute a part of my present invention, there is shown a frame 6 carried by the lower ends of divergent arms 7, the upper ends of which latter are secured by clips 8 to the cross-rod 3 of the steering gear. At the upper end of the frame 6 below the arms 7 there are two forwardly-projecting parallel ears 9—9, and at the bottom of the frame, which latter terminates at a point a short distance above the rail 5, there are formed two other parallel forwardly-projecting ears 10, the outer ends 11 of which diverge as indicated in the drawing. Between the ears 10, the frame 6 carries a U-shaped frame 12 with portions parallel with the ears 10 and other portions 13 converging and united at their outer ends by a web 14. The parallel portion of the ears 10 and the corresponding portions of the frame 12 between these ears coact to form pockets for two jaw-supporting plates 15—15 pivotally hung at their upper ends from a bolt or pivot-rod 16 passing through these jaw-supporting plates and through the ears 9 on the frame 6. These jaw-supporting plates 15 are each under the control of a lever arm 17 projecting up to a point beneath the carriage and connected by links 18 to the operating means within reach of the chauffeur, but which means are not shown in the drawing. Near the lower ends these two jaw-supporting plates are connected by a bolt or guide 19 allowing a certain degree of lateral movement of the jaw-supporting plates, and surrounding this rod 19 and interposed between the said plates 15 is a compression spring 20. Now, when the levers 17 are manipulated in the proper manner, the plates 15 will be moved around the pivot rod 16 in such manner as to be swung forward in the direction of travel of the motor vehicle and carried out of the pockets formed by the frame 12 and parallel portions of the ears 10. As soon as they escape from the pockets the plates will be forced laterally apart by the spring 20, the said plates being so loosely pivoted upon the rod 16 as to permit of this movement. When, however, the levers 17 are manipulated to swing the plates 15 toward the rear, they will engage with the divergent ends 11 of the ears 10 and be thereby guided into the pockets formed between these ears 10 and the frame 12, the spring 20 being by this action compressed.

To the lower end of each jaw-carrying plate 15 is firmly secured a clamp jaw 21 consisting of a U-shaped frame with the mouth thereof opposite the tread of the rail 5, there being one jaw on one side of the rail and another jaw on the other side of the rail, and the two jaws being arranged in opposition. Each jaw carries a number of grooved rollers 22 journaled in an upright position upon journal pins 23 fast in the top and bottom legs of the U-shaped clamp jaw frames. These frames 21 have at each end projecting, pointed deflector fingers 24 so arranged that when the arms are brought toward each other the points of these fingers 24 will come in conjunction over the center of the tread of the rail and thereby tend to throw off any obstruction which may have become lodged on the rail.

The frame 6 is made rigid with respect to the motor car by means of a brace 25 passing through said frame near its lower end and appropriately bent to grasp and be secured to the rod 3. Now, when the plates 15 are seated in the pockets formed on the frame 6 as before described, the two jaws 21 are brought together sufficiently to cause the grooved rollers 22 to grasp the tread of the rail 5 on each side, so that the motor car is held to the rail against either vertical or lateral displacement relative thereto, but movement of the said motor car along said rail is not opposed in any manner but is facilitated by the rollers 22 which act in this connection as anti-friction rollers, so that the jaws of the clamp are, in fact, anti-friction clamping jaws for confining the motor car to the line of travel directed by the rail. Now, it will be evident that so long as the motor car is clamped to the rail through the rod 3 of the steering gear, the car must perforce travel upon the treadways 4 provided for the purpose, and it will be seen that the motor car will be held to the prescribed path whether the same be straight or curved.

It will be observed that the construction of the clamping device is such that any friction which may be generated by the forward motion of the motor car will tend to keep the clamp firmly seated in the pockets receiving the clamp plates or hangers 15, and that there is, therefore, no danger that the clamp will become disconnected from the guide rail 5.

When it is desired to release the motor car from the rail, so that the car may travel under the volition of the chauffeur, it is only necessary to move the plates 15 in a forward direction around the pivot point 16 when the spring 20 will cause the diverging of the clamp jaws as soon as the plates 15 have escaped from the pockets; and in order to clamp the vehicle to the rail it is only necessary to reverse the order of this procedure.

It will be further observed from the foregoing description that the clamping device is intended to be so constructed and attached to the car and to be so under the control of the operator as to fully carry out the purposes for which it is designed. Therefore, I am not confined to the exact structure shown and described but may vary the same without departing from the scope and spirit of my invention.

I claim:—

1. A motor car traffic system comprising a guide-rail for directing the line of travel of the motor car, a clamp for the same comprising a suitable supporting frame, clamping jaws, pivotal supports for the same, and converging guides for said jaws for moving them into operative relation with the guide rail.

2. A motor car traffic system comprising a guide-rail for the motor car and means for clamping the same to the guide-rail consisting of a suitable frame attached to the car, anti-friction clamp jaws arranged to engage the rail-tread, pivotal hangers for said jaws, a spring tending to separate said jaws, and guiding means for the jaw hangers carried by said frame and constructed to force said jaws toward each other when the hangers are moved rearwardly.

3. A motor car traffic system comprising a guide-rail for the motor car and a clamp for coupling the motor car to the guide-rail comprising a suitable supporting frame connected to the motor car, clamp jaws provided with anti-friction roller-engaging surfaces, hanger plates carrying said clamp jaws and pivotally supported from the aforesaid frame, a spring tending to separate said hangers and the jaws carried thereby, pockets formed on the frame for receiving the hanger plates when the jaws are in operative relation to the rail, and guides leading to said pockets and causing, in conjunction with the spring, a lateral movement of the clamp jaws relative to the rail.

4. A motor car traffic system comprising a guide-rail for the motor car and a clamp mechanism for coupling the motor car to the guide rail consisting of clamp jaws provided with anti-friction rollers with grooved engaging faces for the rail, pointed deflector fingers formed on said jaws and coacting to remove obstructions from the rail, pivotal hangers for said jaws capable of movement around their pivots and laterally thereto, a frame supporting the clamping mechanism and attached to the motor vehicle, pockets formed on the frame, guides leading to said pockets, and a spring acting on said hangers and tending to move the same laterally away from each other.

5. A motor car traffic system comprising a guide rail and a clamp for coupling the motor car to said rail consisting of a suitable frame coupled to a portion of the steering gear of the motor car, pockets with divergent mouths carried by said frame, hanger plates also carried by said frame, pivotal supports for said hanger plates permitting the said hanger plates to swing in the direction of travel of the motor car and also laterally thereto, clamp jaws carried by said hanger plates and provided with grooved roller clamping faces, coacting deflector fingers on said jaws for removing obstructions from the rail, a spring acting on the jaw-carrying hangers and tending to move the same laterally, and connections from the clamp to the motor car body for manipulating said clamp.

In testimony that I claim the foregoing as my own, I have hereto affixed my signature in the presence of two witnesses:

ROBERT T. YATES.

Witnesses:
A. S. RIFE,
WM. M. MORGAN.